(12) United States Patent
Wang et al.

(10) Patent No.: US 10,041,306 B2
(45) Date of Patent: Aug. 7, 2018

(54) FATIGUE PERFORMANCE ENHANCER

(71) Applicants: Howard H. Wang, Katy, TX (US);
Wan-Cai Kan, Houston, TX (US)

(72) Inventors: Howard H. Wang, Katy, TX (US);
Wan-Cai Kan, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/407,846

(22) Filed: Jan. 17, 2017

(65) Prior Publication Data

US 2017/0234080 A1 Aug. 17, 2017

Related U.S. Application Data

(60) Provisional application No. 62/296,112, filed on Feb. 17, 2016.

(51) Int. Cl.
| F16L 13/04 | (2006.01) |
| E21B 17/01 | (2006.01) |
| E21B 17/02 | (2006.01) |
| F16L 1/12  | (2006.01) |

(52) U.S. Cl.
CPC ............ *E21B 17/017* (2013.01); *E21B 17/01* (2013.01); *E21B 17/02* (2013.01); *F16L 1/123* (2013.01); *F16L 13/04* (2013.01)

(58) Field of Classification Search
CPC . F16L 13/04; F16L 13/06; F16L 21/06; F16L 21/065; E21B 17/01; E21B 17/017; E21B 17/02

USPC .................................. 405/157, 172, 224.2
See application file for complete search history.

(56) References Cited

U.S. PATENT DOCUMENTS

| 220,407 | A | * | 10/1879 | Mixer et al. ............ | F16L 13/04 |
| | | | | | 285/148.7 |
| 1,933,749 | A | * | 11/1933 | Marray ................... | F16L 13/04 |
| | | | | | 228/138 |
| 3,870,350 | A | * | 3/1975 | Loncaric ................. | F16L 13/06 |
| | | | | | 138/155 |
| 4,300,598 | A | * | 11/1981 | Royer ..................... | F16L 57/02 |
| | | | | | 138/103 |

(Continued)

FOREIGN PATENT DOCUMENTS

| CA | 2814200 A1 * | 4/2012 | .......... B21C 37/065 |
| EP | 2 503 093 | 9/2012 | |

(Continued)

*Primary Examiner* — Frederick L Lagman
(74) *Attorney, Agent, or Firm* — ExxonMobil Upstream Research Company-Law Department

(57) ABSTRACT

A rigid riser system including a rigid riser and one or more fatigue performance enhancers. The rigid riser includes a plurality of rigid metal sections welded together to form a plurality of girth weld joints. The one or more fatigue performance enhancers are positioned over one or more of the plurality of girth weld joints of the rigid riser to enhance the fatigue resistance and/or fatigue life. The body of the fatigue performance enhancer may include a central region and two end regions with the central region having a greater average radial cross-sectional thickness than each of the end regions. Methods of enhancing fatigue performance of the rigid riser and fatigue performance enhancers are also disclosed.

15 Claims, 10 Drawing Sheets

(56) References Cited

U.S. PATENT DOCUMENTS

| | | | | |
|---|---|---|---|---|
| 4,644,975 | A * | 2/1987 | Fricker | F16L 13/06 138/110 |
| 4,808,031 | A * | 2/1989 | Baker | F16L 1/123 138/172 |
| 5,526,846 | A | 6/1996 | Maloberti | |
| 6,030,145 | A * | 2/2000 | Stewart, Jr. | E21B 17/015 405/171 |
| 6,450,207 | B2 * | 9/2002 | Villatte | F16L 13/0272 138/172 |
| 6,561,552 | B1 * | 5/2003 | Berg | F16L 21/06 285/367 |
| 7,469,722 | B2 | 12/2008 | Berland | |
| 7,897,267 | B2 * | 3/2011 | Hoyt | B23K 9/0286 138/142 |
| 8,474,539 | B2 * | 7/2013 | Luo | E21B 19/004 166/341 |
| 8,721,222 | B2 * | 5/2014 | Mebarkia | E21B 43/01 405/154.1 |
| 8,869,840 | B2 | 10/2014 | Lund | |
| 8,939,214 | B2 | 1/2015 | Litherland et al. | |
| 2001/0012476 | A1 * | 8/2001 | Louis | F16L 9/18 405/168.2 |
| 2001/0045239 | A1 | 11/2001 | Villatte et al. | |
| 2005/0175413 | A1 * | 8/2005 | Fontaine | E21B 17/015 405/168.2 |
| 2008/0284162 | A1 * | 11/2008 | Piscitelli | F16L 21/005 285/236 |
| 2011/0049879 | A1 * | 3/2011 | Fitzpatrick | F16L 13/0236 285/420 |
| 2012/0241037 | A1 * | 9/2012 | Lund | E21B 17/017 138/106 |
| 2012/0304447 | A1 * | 12/2012 | Smith | F16L 57/02 29/434 |
| 2014/0328631 | A1 * | 11/2014 | Luo | E21B 17/017 405/224.2 |
| 2015/0136264 | A1 | 5/2015 | Holland et al. | |
| 2017/0175460 | A1 * | 6/2017 | Mansour | B23K 31/02 |

FOREIGN PATENT DOCUMENTS

| | | |
|---|---|---|
| GB | 2 040 014 | 8/1980 |
| WO | WO 2014/096767 A2 | 6/2014 |
| WO | WO 2015/070908 A1 | 5/2015 |
| WO | WO 2015/071684 A2 | 5/2015 |

* cited by examiner

FATIGUE PERFORMANCE ENHANCER

CROSS-REFERENCE TO RELATED APPLICATION

This application claims the benefit of U.S. Provisional Patent Application Ser. No. 62/296,112, filed Feb. 17, 2016, entitled FATIGUE PERFORMANCE ENHANCER, the entirety of which is incorporated by reference herein.

FIELD

The present disclosure relates to a fatigue performance enhancer for enhancing the fatigue resistance and/or fatigue life of a conduit onto which the enhancer is attached.

BACKGROUND

This section is intended to introduce various aspects of the art, which may be associated with one or more embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Bend stiffeners are used in offshore flexible pipe and umbilical applications. Bend stiffeners are typically used with flexible pipes and umbilicals in the hang-off zone. Bend stiffeners typically have a truncated conical shape and are used to limit bending stresses to within acceptable levels at an end of the flexible pipe or umbilical where such is connected to an offshore structure located on a body of water or other rigid structure. The conical shape provides for a decreasing stiffness between the rigid structure and the unrestrained flexible pipe or umbilical. U.S. Patent Application Publication Number 2015/0136264 A1 describes the use of a bend stiffener at the end of a flexible pipe segment connected to a rigid end fitting.

Bend restrictors may also be used along a conduit to limit bending to a maximum value. Bend restrictors are typically articulated which allows flexing but limits the bend radius to a maximum. Bend restrictors thus do not limit stiffness and accordingly do not significantly improve the fatigue performance (fatigue resistance and/or fatigue life) of the underlying conduit. International Patent Application Publication Number WO 2015/071684 A2 describes the use of an articulated bend restrictor placed along a length of a flexible pipe to limit the bend radius. The described bend restrictor has fixed end sections with a plurality of intermediate sections disposed there between. The intermediate sections alternate male sections and female sections held in position by the fixed end sections.

Unlike flexible pipes, umbilicals, cables, and the like, rigid steel risers are manufactured by girth welding steel pipe joints to form the rigid riser. Using rigid risers in offshore applications can give rise to areas where the rigid riser experiences high fatigue, such as within the touchdown zone and/or the hang-off zone. The girth weld joints of a rigid riser are susceptible to fatigue. When dealing with a rigid riser system, high performance girth welds are currently utilized to improve the fatigue performance within the high fatigue areas of the rigid riser. High performance girth welds utilize costly welding consumables and require controlled welding conditions in order to control the heat affected zone within the girth weld joint. High performance girth welds also require fatigue testing to confirm the fatigue performance whereas lower performance girth welds merely require workmanship inspection or no inspection at all. High performance girth welds, therefore, increase the cost and efficiency of manufacturing rigid risers.

Thus, there is a desire to provide a fatigue performance enhancer that provides enhanced fatigue performance (fatigue resistance and/or fatigue life) of girth weld joints within a rigid riser. In one aspect, the fatigue performance enhancer improves the fatigue performance of a lower performance girth weld joint allowing the use of lower cost and more efficient girth welding processes in the manufacture of a rigid riser to obtain similar fatigue life as high performance weld joints or improves the fatigue performance of a higher performance girth weld joint allowing the use of rigid risers in more challenging offshore environments where use was previously prevented due to the fatigue limitations of the girth weld joints.

SUMMARY

This summary is meant to provide an introduction to the various embodiments described herein and is not meant to limit the scope of the claimed subject matter.

An aspect of the present disclosure relates to a fatigue performance enhancer including a body. The body of the enhancer includes a central region extending a first axial length, a first end region extending a second axial length, and a second end region extending a third axial length. The first, second, and third axial lengths form the total length of the enhancer. The central region has a greater average radial cross-sectional thickness than each of the first and second end regions.

Another aspect of the present disclosure relates to a fatigue performance enhancer used in a rigid riser system. The rigid riser system includes a rigid riser and one or more fatigue performance enhancers. The rigid riser includes a plurality of rigid metal sections welded together to form a plurality of girth weld joints. The one or more fatigue performance enhancers are positioned over one or more of the plurality of girth weld joints of the rigid riser.

Another aspect of the present disclosure relates to a method of enhancing fatigue performance of a rigid riser which includes installing one or more fatigue performance enhancers over one or more girth weld joints between rigid metal sections of the rigid riser.

Other aspects of the present disclosure will be apparent from the following description and the appended claims.

BRIEF DESCRIPTION OF THE DRAWINGS

The foregoing and other advantages of the present disclosure may become apparent upon reading the following detailed description and upon reference to the drawings, in which.

DESCRIPTION

Figure 1:
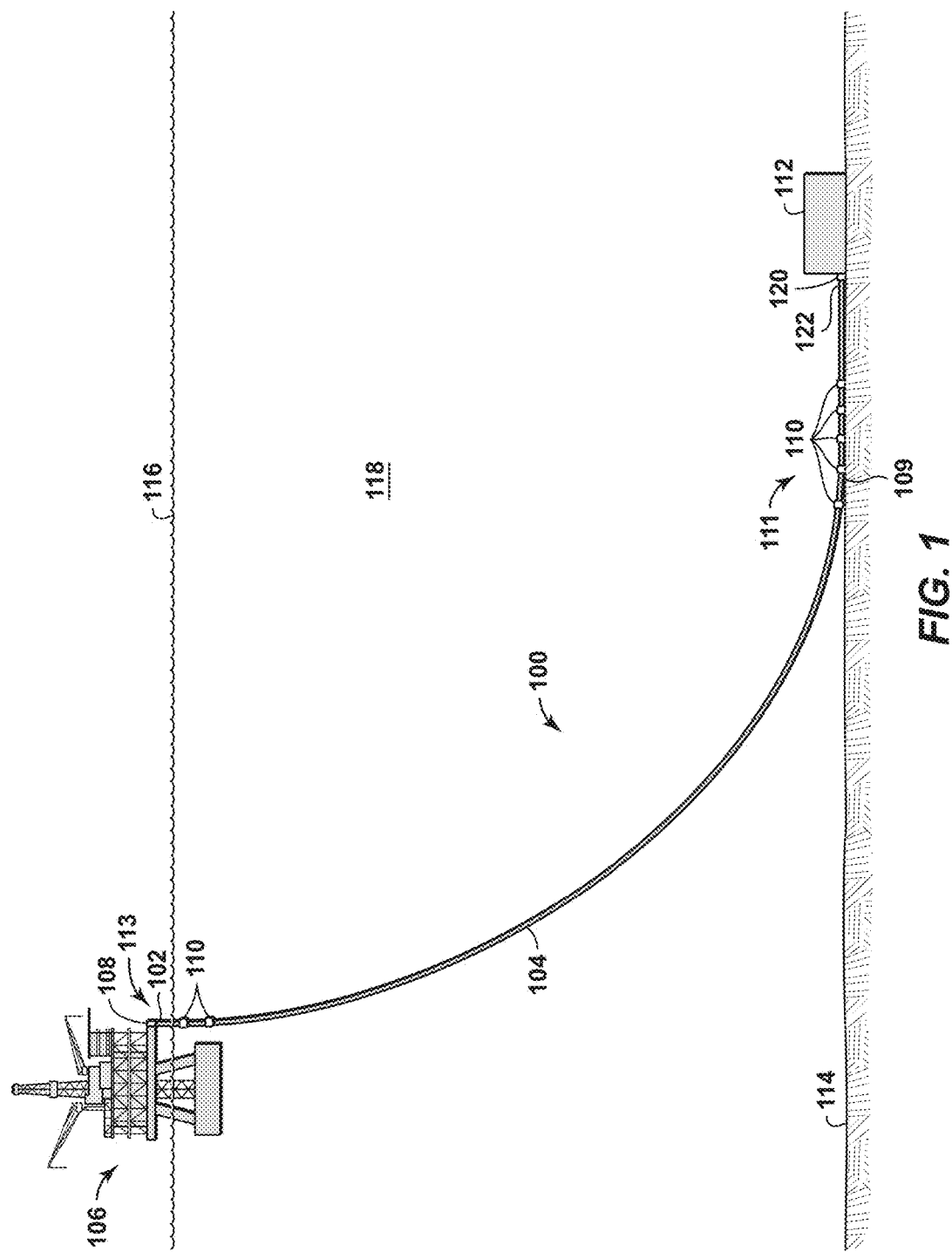
FIG. 1 illustrates a riser system in accordance with one or more embodiments of the present disclosure.

In the following detailed description section, the specific embodiments of the present disclosure are described in connection with one or more embodiments. However, to the extent that the following description is specific to a particular embodiment or a particular use of the present disclosure, this is intended to be for exemplary purposes only and simply provides a description of the one or more embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

Certain terms are used throughout the following description and claims to refer to particular features or components. As one skilled in the art would appreciate, different persons may refer to the same feature or component by different names. This document does not intend to distinguish between components or features that differ in name only. The drawing figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, quantities, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of 1 to 4.5 should be interpreted to include not only the explicitly recited limits of 1 to 4.5, but also to include individual numerals such as 2, 3, 4, and sub-ranges such as 1 to 3, 2 to 4, etc. The same principle applies to ranges reciting only one numerical value, such as "at most 4.5", which should be interpreted to include all of the above-recited values and ranges. Further, such an interpretation should apply regardless of the breadth of the range or the characteristic being described.

The term "rigid riser" as used herein is meant to include a length of conduit formed by girth welding together the ends of a plurality of rigid metal sections positioned between subsea equipment located proximate the seafloor and an offshore structure located closer to the surface of a body of water than such subsea equipment. In one or more embodiments, the rigid metal sections may comprise a steel material, an aluminum alloy, or a cast iron material. Steel materials for the rigid metal sections may be selected from the American Petroleum Institute standard steel grades of X65, X70, X80, X100, and combinations thereof. The rigid metal sections of the riser may have an outer diameter at most 76.2 centimeters (cm) (30 inches) or at most 53.3 cm (21 inches) or at most 45.7 cm (18 inches), for example in the range of from 15.2 cm (6 inches) to 76.2 cm (30 inches) or from 25.4 cm (10 inches) to 53.3 cm (21 inches).

The term "single-line hybrid riser" (SLHR) as used herein is meant to include a length of riser formed by girth welding together the ends of a plurality of rigid metal sections, such as steel pipe joints, which extends between the seafloor and an intermediate offshore structure including a buoyancy member, such as a buoyancy tank, located between the surface of a body of water and the seafloor. A flexible jumper operatively connects the length of rigid riser terminating at the intermediate offshore structure to an offshore structure located on the surface of the body of water.

The term "steel catenary riser" (SCR) as used herein is meant to include a length of riser formed by girth welding together the ends of a plurality of rigid metal sections, such as steel pipe joints, which extends typically between an offshore structure on the surface of a body of water and the seafloor. A SCR is commonly a free hanging riser which forms a single curved catenary section.

The term "lazy wave riser" (LWR) as used herein is meant to include a length of riser formed by girth welding together a plurality of rigid metal sections, such as steel pipe joints, which typically extends between an offshore structure on the surface of a body of water and the seafloor. A LWR is commonly a free hanging riser which uses buoyancy elements to form multiple curved sections to reduce fatigue in the touchdown zone.

The term "top tensioned riser" (TTR) as used herein is meant to include a length of pipe formed by welding together a plurality of rigid metal sections, such as steel pipe joints, which typically extends between an offshore structure on the surface of a body of water and the seafloor. A TTR, unlike a SCR or a LWR, does not include any substantial curvature in the riser.

The term "riser tower" as used herein is meant to include a central core pipe either supported at the upper end by a buoyancy member, such as a buoyancy tank, or distributed buoyancy elements along the length of the central core pipe. One or more rigid risers are supported by the central core pipe.

The term "touchdown zone" (TDZ) as used herein is meant to include a length of a riser proximate the touchdown point where the riser meets the seafloor. The TDZ of a riser is a high fatigue area for the girth weld joints contained therein.

The term "hang-off zone" (HOZ) as used herein is meant to include a length of a riser proximate the connection of the riser to the structure proximate the surface of a body of water. The HOZ of the riser is another area of high fatigue for the girth weld joints contained therein.

The term "subsea equipment" as used herein is meant to include any suitable subsea equipment to which a riser may be operatively connected proximate the seafloor, such as a wellhead, a tree, a manifold, a pipeline end termination (PLET), or a flowline end termination (FLET).

FIG. 1 illustrates a riser system in accordance with one or more embodiments of the present disclosure. As illustrated, the upper end 102 of the rigid riser 104 of the rigid riser system 100 is connected to an offshore structure 106 located on the surface 116 of the body of water 118 via the upper connector 108. Although the offshore structure depicted in FIG. 1 is a floating platform, other structures may be located at the water surface such as a floating production, storage and offloading vessel, a drill ship and the like. The offshore structure may be used for drilling operations and/or the production of produced fluids (such as oil and/or gas) from the reservoir. The lower end 122 of the rigid riser 104 of the rigid riser system 100 is connected to subsea equipment 112 located on the seafloor 114 via the lower connector 120. The rigid riser system 100 includes fatigue performance enhancers 110 (also may be referred to as "weld fatigue enhancers" or "weld joint stiffeners") positioned over girth weld joints (not shown) in the rigid riser 104 in the TDZ 111 and in the HOZ 113. The touchdown point 109 is the point where the rigid riser system contacts the seafloor.

Figure 2:
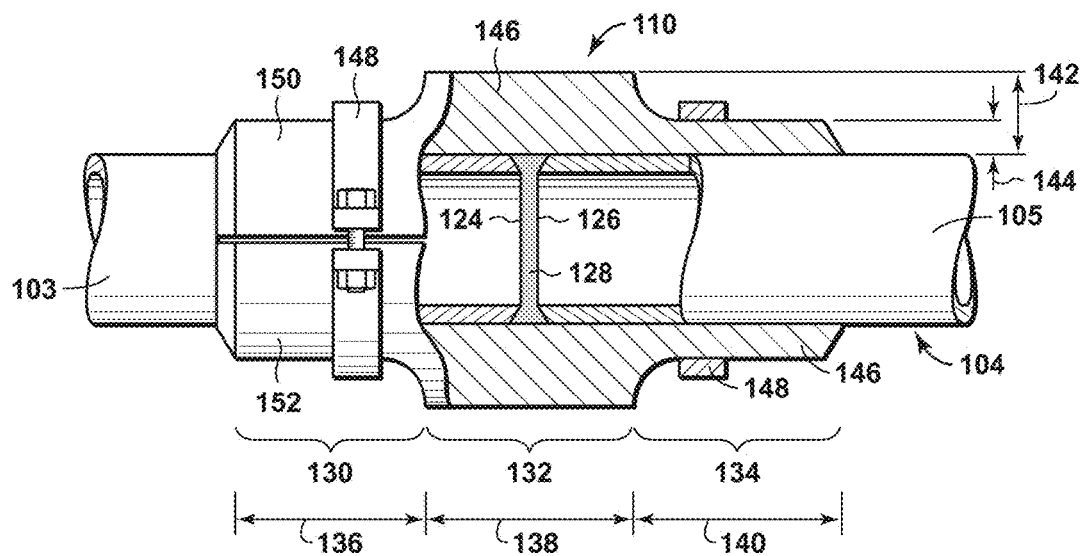
FIG. 2 illustrates a portion of the rigid riser system with a fatigue performance enhancer illustrated in FIG. 1.

FIG. 2 illustrates a portion of the rigid riser 104 illustrated in FIG. 1 that includes a fatigue performance enhancer 110. It is understood that the same reference numerals used in FIG. 1 are similarly used in FIG. 2 as well as other figures provided herein when referencing the same components. As depicted in FIG. 2, fatigue performance enhancer 110 has a body 146 circumferentially disposed around the circumference of a girth weld joint 128. The girth weld joint 128 connects end 124 of rigid metal section 103 to end 126 of rigid metal section 105. The body 146 of the fatigue performance enhancer 110 includes a central region 132, a first end region 130, and a second end region 134.

Radial cross-sectional thickness 142 is depicted for central region 132 and radial cross-sectional thickness 144 is depicted for second end region 134. The radial cross-sectional thickness would be similarly measured for the first end region 130 although not shown in FIG. 2. In one or more embodiments, the average radial cross-sectional thickness of the central region may be greater than the average cross-sectional thickness of the first end region and the second end region. In one or more embodiments, the average radial cross-sectional thickness of the central region may be at least 1.25 times greater than the average radial cross-sectional thickness of each of the first end region and the second end region, for example at least 1.5 times greater than, at least 1.75 times greater than, or at least 2 times greater than, on the same basis. In an embodiment, the central region includes the axial length of the fatigue performance enhancer having a greater radial cross-sectional thickness than (or at least 1.25 times greater than, or at least 1.5 times greater than, or at least 1.75 times greater than, or at least 2 times greater than) the average radial cross-sectional area of each of the end regions. In other words, the central region ends once the radial cross-sectional thickness is less than (or less than 1.25 times, or less than 1.5 times, or less than 1.75 times, or less than 2 times) the average radial cross-sectional thickness of the adjacent end regions. In an exemplary embodiment, the average radial cross-sectional thickness of the central region is 13 cm to 30.5 cm (5 inches to 12 inches), the average radial cross-sectional thickness of the first end region is 2.5 cm to 10 cm (1 inch to 4 inches), and the average radial cross-sectional thickness of the second end region is 2.5 cm to 10 cm (1 inch to 4 inches). In another exemplary embodiment, the average radial cross-sectional thickness of the central region is 15.2 cm to 25.4 cm (6 inches to 10 inches), the average radial cross-sectional thickness of the first end region is 5 cm to 7.6 cm (2 inches to 3 inches), and the average radial cross-sectional thickness of the second end region is 5 cm to 7.6 cm (2 inches to 3 inches).

Referring to FIG. 2, central region 132 has an axial length 138 (a first axial length), first end region 130 has an axial length 136 (a second axial length), and second end region 134 has an axial length 140 (a third axial length). The axial length 136, 138, and 140 forms the total axial length of the fatigue performance enhancer 110. The dimensions of the first end region 130 is substantially the same as the dimensions of the second end region 134. Central region 132 is radially and longitudinally symmetric about the center of the fatigue performance enhancer which is positioned over the girth weld joint 128.

In one or more embodiments, the total axial length of the fatigue performance enhancer may be less than the length of each of the rigid metal sections welded together, for example at most 50% of the axial length of each of the rigid metal sections welded together, or at most 40% of the axial length of each of the rigid metal sections welded together, or at most 30% of the axial length of each of the rigid metal sections welded together. In one or more embodiments, the total axial length of the fatigue performance enhancer may be at most 5 meters (m), or at most 3 m, or at most 2 m.

In one or more embodiments, the first end region and the second end region of the fatigue performance enhancer may have substantially the same axial length and the axial length of the central region may be substantially the same as or less than the sum of the axial length of the first end region and the second end region. For example, the axial length of the central region may be at most 80 percent (%) of the sum of the axial length of the first end region and the second end region, or at most 75%, or at most 67%, on the same basis. In one exemplary embodiment, the central region is 0.5 m in axial length and each of the first end region and second end region is 0.25 m in axial length (axial length of 0.5 m for the sum of the first end region and the second end region) for a total axial length of the fatigue performance enhancer of 1 m. In another exemplary embodiment, the central region is 0.5 m in axial length and each of the first end region and second end region is 0.75 m in axial length (axial length of 1.5 m for the sum of the first end region and the second end region) for a total axial length of the fatigue performance enhancer of 2 m.

As depicted in FIG. 2, the portion of maximum radial cross-sectional thickness in central region 132 is positioned over the girth weld joint 128. By providing a central region having a greater average cross-sectional thickness than each of the end regions 130, 134 and each end region 130, 134 having a length the same as or greater than the central region 132 allows the fatigue performance enhancer to enhance the fatigue performance of the girth weld joint while further minimizing the amount of material required to form the body of the fatigue performance enhancer.

Figure 5:
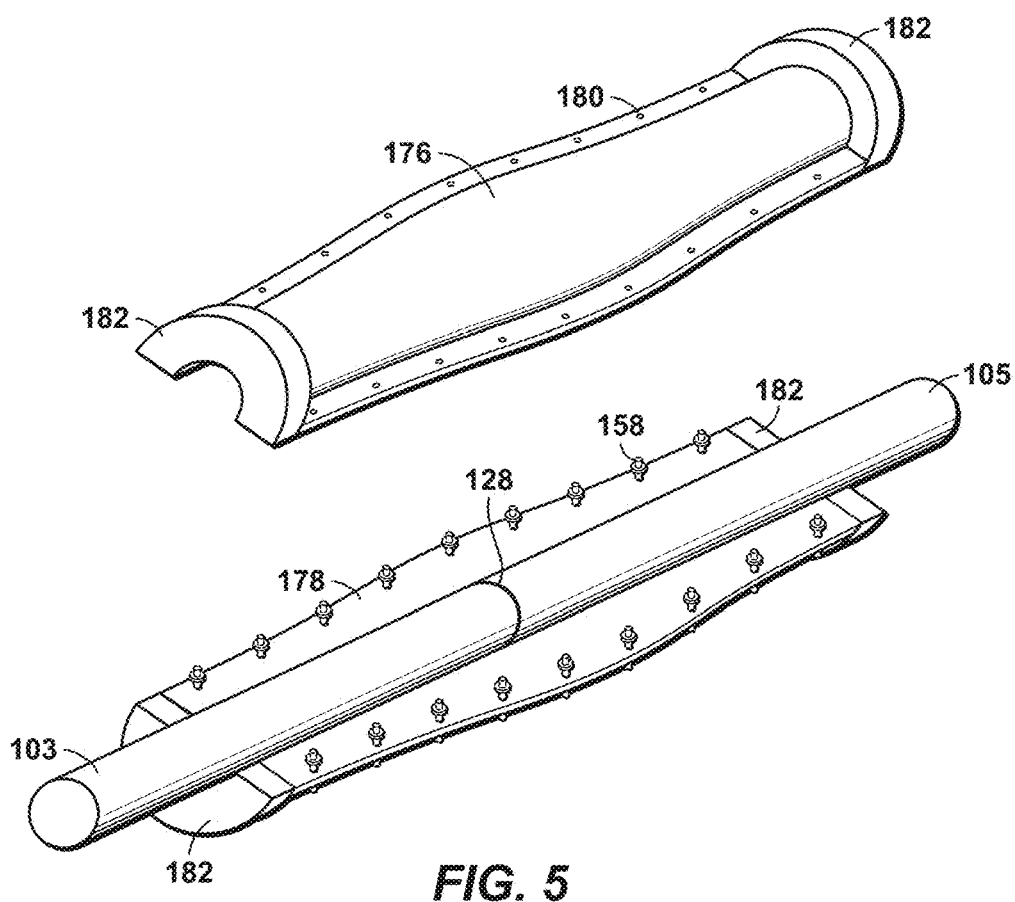
FIG. 5 illustrates a fatigue performance enhancer according to one or more embodiments of the present disclosure.

Referring again to FIG. 2, the body 146 of the fatigue performance enhancer 110 has two axial unitary segments 150, 152 disposed around the circumference of the rigid riser 104. The axial unitary segments 150, 152 are held in position using fasteners 148. Fasteners may be positioned in any suitable location to secure the body of the fatigue performance enhancer to the rigid riser. As depicted in FIG. 2, fasteners 148 are positioned within the end regions 130, 134. As depicted in FIG. 5, in other embodiments, fasteners 158 are positioned within the central region as well as the end regions.

In one or more embodiments, the body of the fatigue performance enhancer may include at least three or more axial unitary segments. In one or more embodiments, fasteners may be positioned in any suitable location to secure the body of the fatigue performance enhancer to the rigid riser. The fastener may be any suitable fastener such as a mechanical fastener. The mechanical fasteners may be selected from a strap, a clamp, a bolted ring, a bolt, and any combination thereof. The inner surfaces of the axial unitary segments, such as the two axial unitary segments 150, 152, of the fatigue performance enhancer form a substantially continuous, uninterrupted surface directly adjacent the outer surface of the rigid riser extending between the ends of the fatigue performance enhancer, the only interruption of the inner surface of the fatigue performance enhancer being the longitudinal seams between the axial segments. Although not depicted, there may be a small gap between the outer surface of the riser and the inner surface of the fatigue performance enhancer due to manufacturing tolerances. The outer surfaces of the axial unitary segments, such as the two axial unitary segments 150, 152, of the fatigue performance enhancer also form a substantially continuous, uninterrupted surface, the only interruption of the outer surface of the fatigue performance enhancer being the longitudinal seams between the axial segments.

Figure 3:
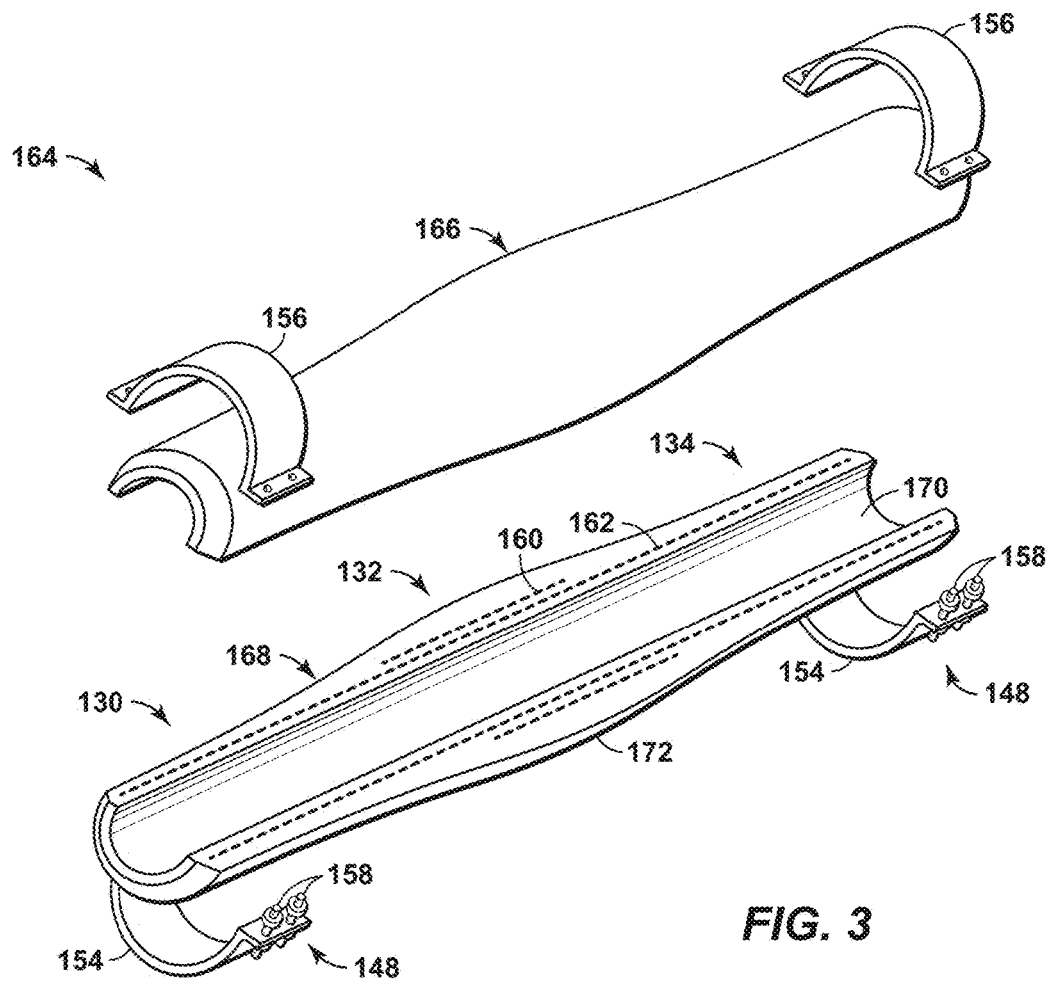
FIG. 3 illustrates a fatigue performance enhancer according to one or more embodiments of the present disclosure.

FIG. 3 illustrates a fatigue performance enhancer according to one or more embodiments of the present disclosure. The fatigue performance enhancer 164 includes two axial unitary segments 166, 168. The fasteners 148 are bolted rings which include a first radial section 154 and a second radial section 156 connected together with bolts 158 to hold the axial unitary segments 166, 168 in position. It is understood that any suitable bolted ring may be used as a fastener for the fatigue performance enhancer. It is also understood that use of the term "bolt" herein also includes the associated nut for retention of the threaded body of the bolt. The body of the fatigue performance enhancer 164 includes a metallic insert 162 disposed within the body of the fatigue performance enhancer 164 between the inner surface 170 and the outer surface 172 of the body of the fatigue performance enhancer 164. The metallic insert 162 extends the axial length of the central region 132 and substantially the axial length of the first end region 130 and the second end region 134. In one or more embodiments, the metallic insert may extend at least the axial length of the central region of the fatigue performance enhancer. In one or more embodiments, the metallic insert may extend at least 33% of the total axial length of the fatigue performance enhancer, for example at least 50%, at least 75%, at least 80%, or at least 90%, on the same basis.

The body of the fatigue performance enhancer may be made of any suitable material capable of providing the desired stiffness and resulting fatigue performance of the underlying conduit (e.g., the associated girth weld joint of a conduit such as a rigid riser). In one or more embodiments, the majority of the body of the fatigue performance enhancer may include a polymeric material. The polymeric material may have a Young's modulus in the range of from $0.1 \times 10^9$ to $25 \times 10^9$ Newton per meter squared ($N/m^2$) or in the range of from $0.8 \times 10^9$ to $20 \times 10^9$ $N/m^2$. In one or more embodiments, the polymeric material of the body of the fatigue performance enhancer may comprise at least 75% of the total volume of the body of the fatigue performance enhancer or at least 80% of the total volume of the body of the fatigue performance enhancer. In one or more embodiments, the polymeric material may be selected from polyethylene, polypropylene, polyurethane, polyvinyl chloride (PVC), and any combination thereof. In one or more embodiments, the polymeric material includes a polyethylene material which may be a high density polyethylene (HDPE) material. In one or more embodiments, the polymeric material may be a composite material such as a fiber-reinforced polymeric material. In one or more other embodiments, the body of the fatigue performance enhancer may be formed of metallic material selected from a steel, a cast iron, or an aluminum alloy. A body of metallic material for the fatigue performance enhancer may also include a corrosion resistant coating.

Referring to FIG. 3, the body of the fatigue performance enhancer 164 also includes an additional metallic insert 160 positioned entirely within the central region 132 of the fatigue performance enhancer 164 (extending at most the axial length of the central region). The metallic insert 162 extends a greater axial length of the fatigue performance enhancer than the additional metallic insert 160. The greater radial cross-sectional thickness of the central region allows the additional metallic insert 160 to be radially spaced outside (exterior) of the metallic insert 162 and interior of the outer surface 172 of the body of the fatigue performance enhancer 164. Although only one additional metallic insert is depicted in FIG. 3, a plurality of additional metallic inserts may be positioned within the central region of the fatigue performance enhancer.

The metallic inserts may be made of any suitable metallic materials capable of providing the desired stiffness and resulting fatigue performance of the underlying conduit (e.g., the associated girth weld joint of a conduit such as a rigid riser). The metallic insert and any additional metallic inserts may be made of the same or different metallic materials. The metallic material may be any suitable material to enhance the stiffness of the fatigue performance enhancer, such as a carbon steel material or a high strength steel. The metallic insert may also include a corrosion resistant coating. The metallic insert may also include a bonding coating to improve the bonding between the metallic inserts and the polymeric material.

Figure 4:
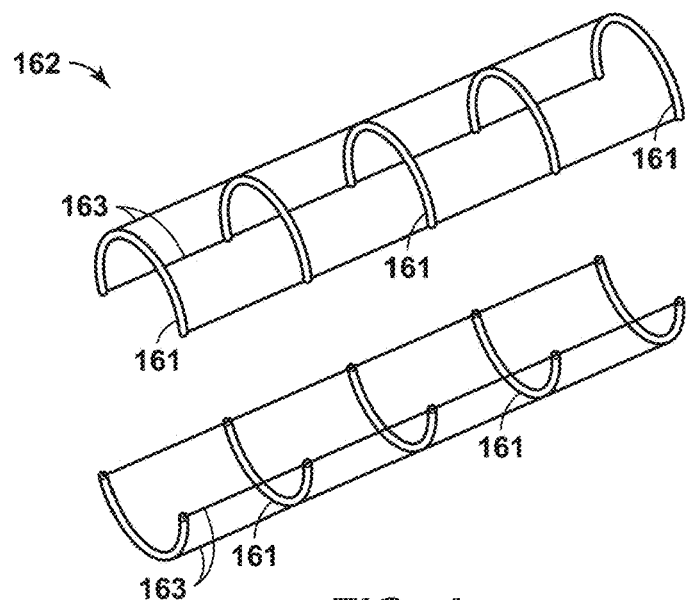
FIG. 4 illustrates a metallic insert according to one or more embodiments of the present disclosure.

FIG. 4 illustrates a metallic insert according to one or more embodiments of the present disclosure. The metallic insert 162 includes a metallic frame including a plurality of longitudinally spaced rings 161 connected by longitudinal members 163. Although only 5 longitudinally spaced rings 161 are depicted in FIG. 4, more longitudinally spaced rings may be utilized as shown in FIG. 3. In other embodiments, the metallic insert may be any suitable shape. In one or more embodiments, the metallic insert may include only a plurality of longitudinally spaced rings without any longitudinal members. In one or more other embodiments, the metallic insert may include only circumferentially spaced longitudinal members.

FIG. 5 illustrates a fatigue performance enhancer according to one or more embodiments of the present disclosure. The fatigue performance enhancer includes two axial unitary segments 176, 178. Each end of the two axial unitary segments 176, 178 have a flange-shaped section 182 forming one half of the flange-shape. The two axial unitary segments 176, 178 include a plurality of openings 180 through which bolts 158 are placed to hold the axial unitary segments 176, 178 in position. The inner surfaces of the two axial unitary segments 176, 178 of the fatigue performance enhancer form a substantially continuous, uninterrupted surface directly adjacent the outer surface of the rigid riser extending between the ends of the fatigue performance enhancer, the only interruption of the inner surface of the fatigue performance enhancer being the longitudinal seams between the axial segments. Similarly, the outer surfaces of the two axial unitary segments 176, 178 form a substantially continuous, uninterrupted surface, the only interruption of the outer surface of the fatigue performance enhancer being the longitudinal seams between the axial segments.

Although the fatigue performance enhancer has been described in use with a rigid riser system, it is understood that the fatigue performance enhancer may be used in any application where a portion of the underlying structure may be subject to fatigue and it is desired to improve the fatigue performance of the area thereof. In one or more embodiments, the fatigue performance enhancer may be positioned over any portion of a SCR, a TTR, a SLHR, a riser tower, a drilling riser, a subsea flowline, a subsea jumper, and any combination thereof. With respect to non-rigid conduits such as a subsea flowline or a subsea jumper, the fatigue performance enhancer may be positioned within an area subject to dynamic motion and/or any area determined to experience high fatigue.

Figure 6:
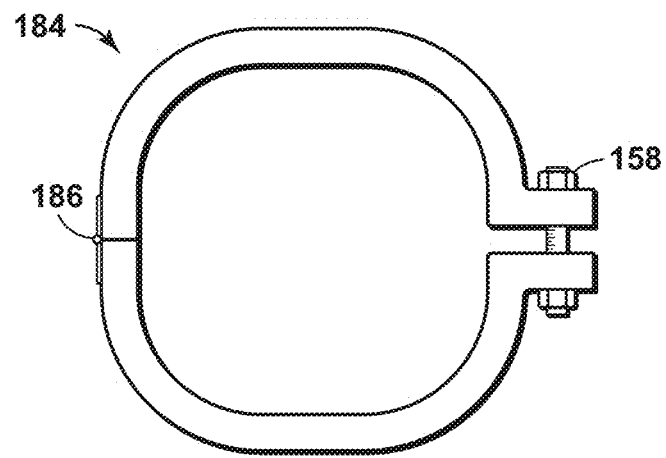
FIG. 6 illustrates a clamp fastener for use with a fatigue performance enhancer according to one or more embodiments of the present disclosure.

FIG. 6 illustrates a clamp fastener according to one or more embodiments of the present disclosure. The clamp 184 includes two halves connected on one side by a hinge 186 to allow placement around the fatigue performance enhancer and a bolt 158 positioned through an opening formed in the two halves to connect the two halves of clamp 184 together. It is understood that any suitable clamp may be used as a fastener for the fatigue performance enhancer.

Figure 7:
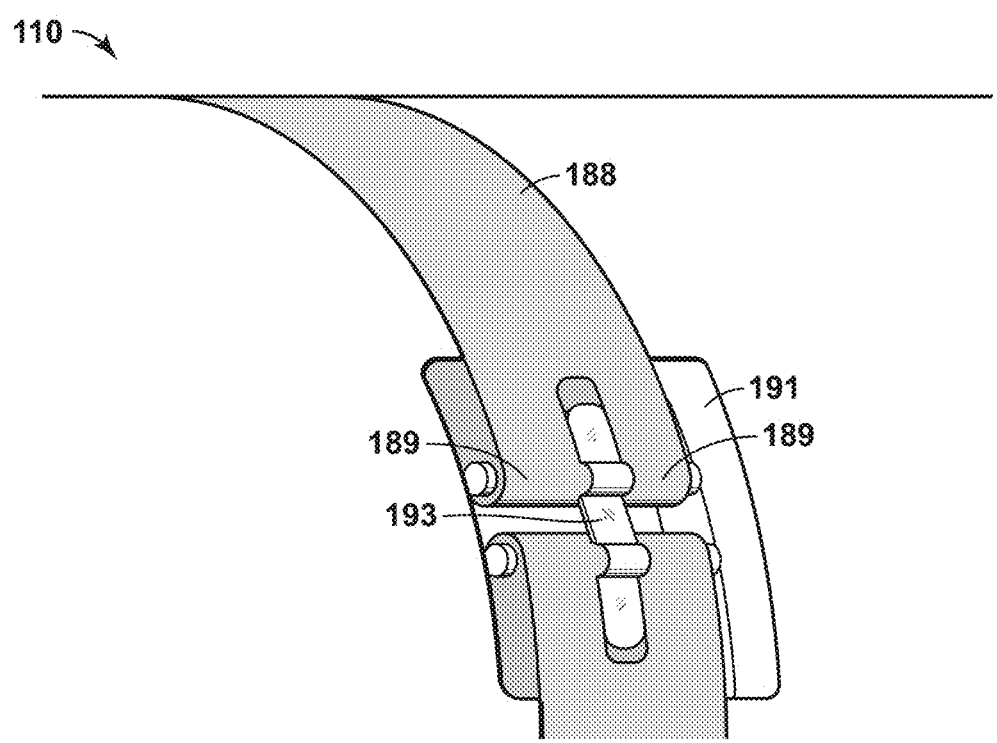
FIG. 7 illustrates a strap fastener for use with a fatigue performance enhancer according to one or more embodiments of the present disclosure.

FIG. 7 illustrates a strap fastener according to one or more embodiments of the present disclosure. The strap 188 is a length sufficient to extend around the circumference of the fatigue performance enhancer 110 and includes two loops 189 at each end into which a "T"-shaped metal insert 193 is received to secure the strap 188 in place within the grove 191. It is understood that any suitable strap may be used as a fastener for the fatigue performance enhancer.

Although a SCR is depicted in FIG. 2 as the rigid riser, the rigid riser may be a SCR, a TTR, a LWR, a SLHR, a riser tower, or a drilling riser. A drilling riser as used herein is similar to a TTR and is used for drilling activities carried out from a drilling unit located on the surface of the body of water.

Figure 8:
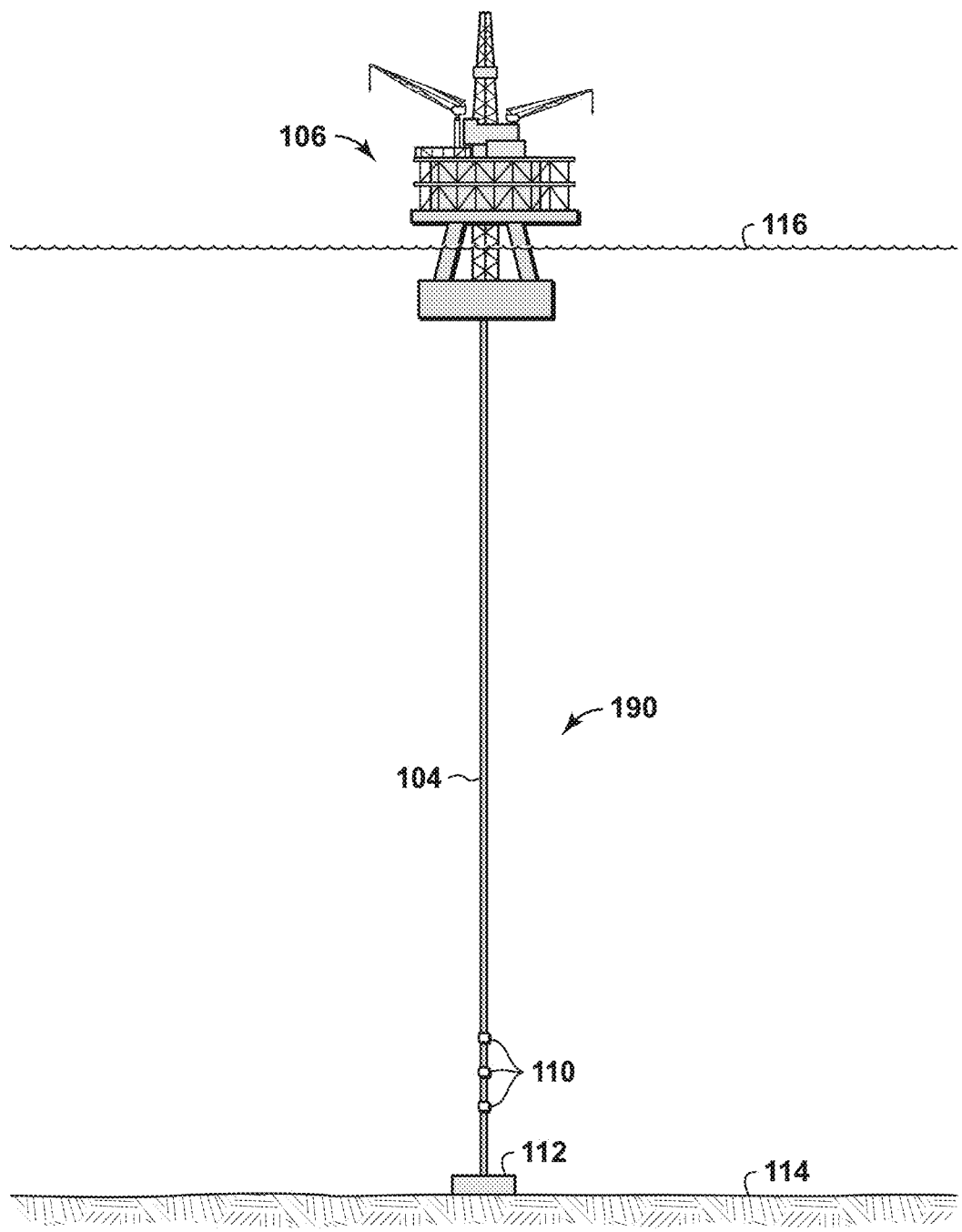
FIG. 8 illustrates a TTR system according to one or more embodiments of the present disclosure.

FIG. 8 illustrates a TTR system according to one or more embodiments of the present disclosure. The TTR system 190 includes rigid riser 104 that is substantially linear and a plurality of fatigue performance enhancers 110 located proximate the subsea equipment 112, such as a wellhead, on the seafloor 114.

Figure 9:
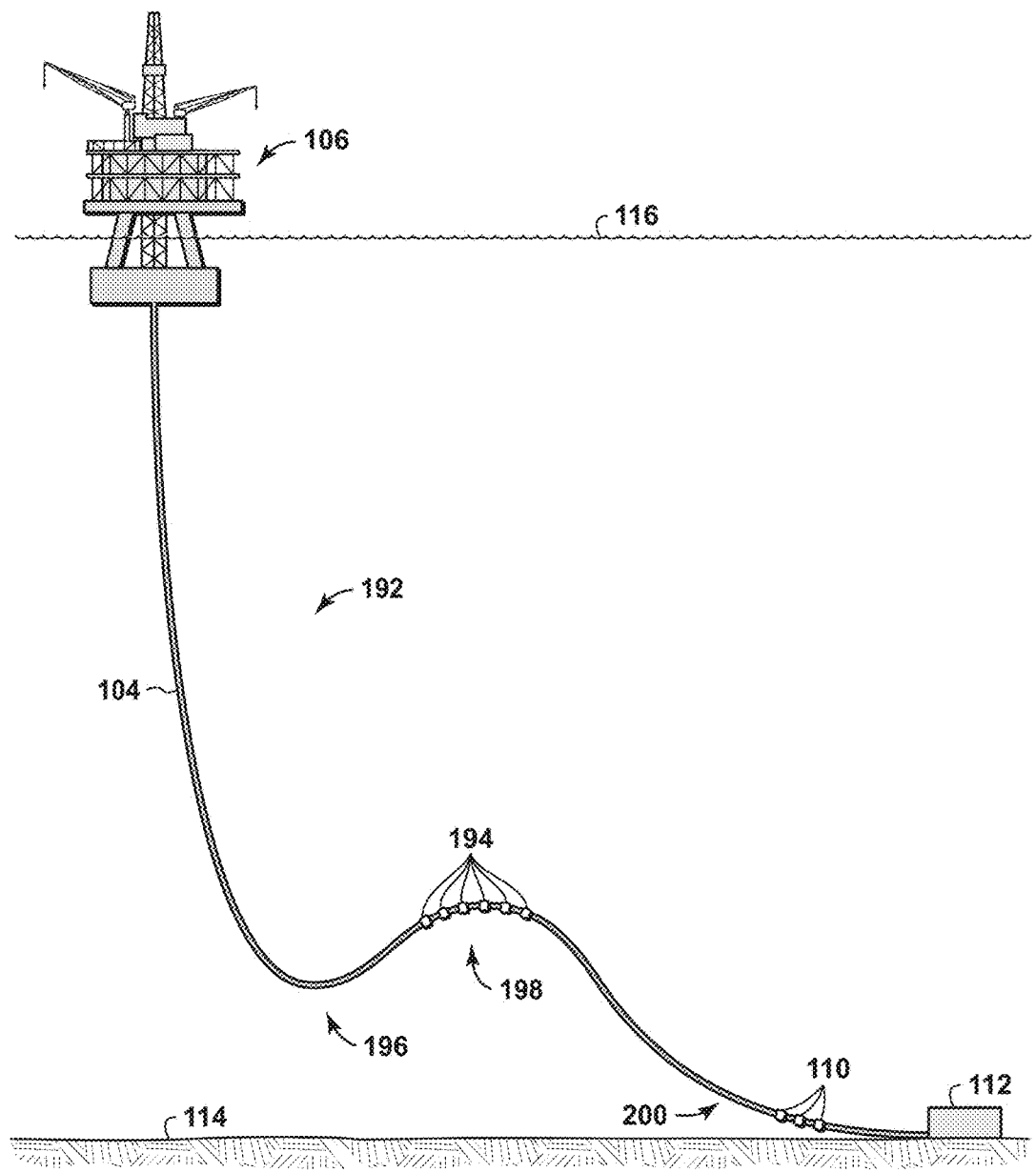
FIG. 9 illustrates a LWR system according to one or more embodiments of the present disclosure.

FIG. 9 illustrates a LWR system according to one or more embodiments of the present disclosure. The LWR system 192 includes rigid riser 104 that includes multiple curved sections 196, 198, 200 and a plurality of fatigue performance enhancers 110 located proximate the subsea equipment 112, such as a wellhead, on the seafloor 114. The convex curved section 198 includes a plurality of buoyancy elements 194. The positive buoyancy provided by the buoyancy elements 194 creates the multiple curved sections of the rigid riser and reduces fatigue in the TDZ. However, use of fatigue performance enhancers may still be desired if the reduction in fatigue is not sufficient to provide the required fatigue performance for the particular application. The buoyancy elements may include a passive buoyant material positioned on the rigid riser although active buoyancy configurations may be used.

Figure 10:
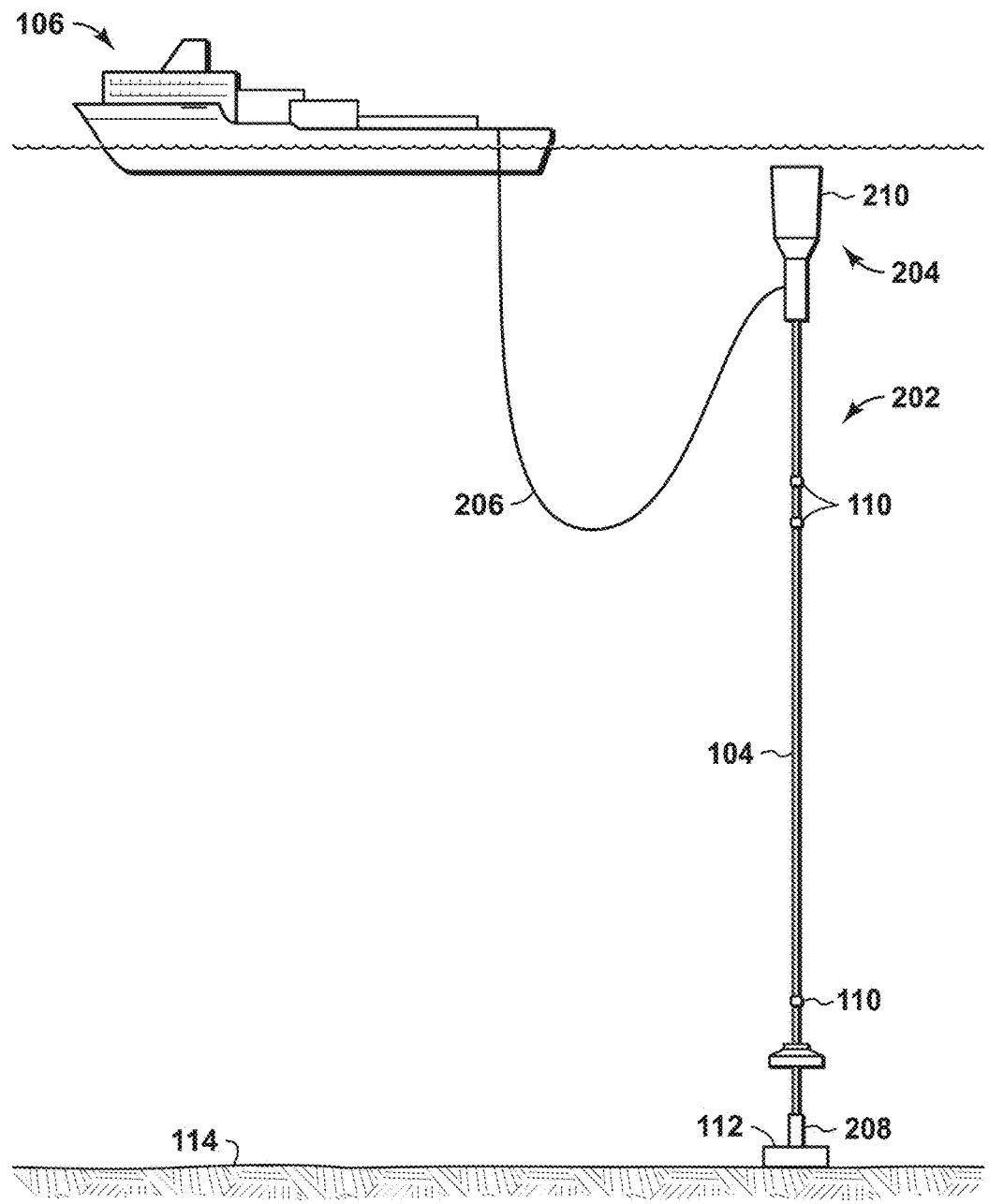
FIG. 10 illustrates a SLHR system according to one or more embodiments of the present disclosure.

FIG. 10 illustrates a SLHR system according to one or more embodiments of the present disclosure. The SLHR system 202 includes rigid riser 104 and a plurality of fatigue performance enhancers 110 located proximate the subsea equipment 112, such as a PLET or FLET, on the seafloor 114 and along the length. The rigid riser 104 has a riser anchor 208 positioned proximate the seafloor 114 above the subsea equipment 112 to which the riser 104 is operatively connected. The upper end (closest to the surface of the body of water) of the rigid riser is connected to the intermediate offshore structure 204 which includes a buoyancy member 210. A flowline 206, such as a flexible pipe or jumper, operatively connects the rigid riser terminating at the intermediate offshore structure 204 to an offshore structure 106 located on the surface of the body of water.

Fatigue performance enhancers may be used at any weld joint location along the length of the rigid riser to improve the fatigue performance. In one or more embodiments, the fatigue performance enhancers may be used in the TDZ, the HOZ, proximate an intermediate offshore structure, proximate the subsea equipment located on the seafloor, or any combinations thereof. In one or more embodiments, the TDZ may include at most 20 fatigue performance enhancers, or at most 15 fatigue performance enhancers, or at most 10 fatigue performance enhancers. In one or more embodiments, the HOZ may include at most 15 fatigue performance enhancers, or at most 10 fatigue performance enhancers, or at most 5 fatigue performance enhancers. In one or more embodiments, the rigid riser proximate an intermediate offshore structure may include at most 10 fatigue performance enhancers or at most 5 fatigue performance enhancers. In one or more embodiments, the rigid riser proximate the subsea equipment located on the seafloor may include at most 10 fatigue performance enhancers, or at most 5 fatigue performance enhancers.

Figure 11B:
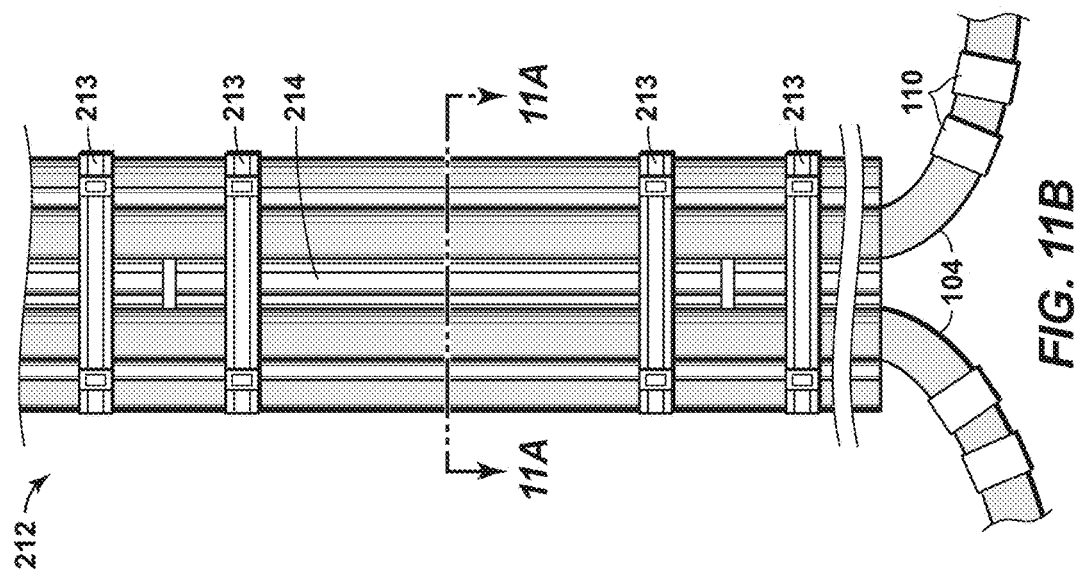
FIG. 11B illustrates partial view of a riser tower system according to one or more embodiments of the present disclosure.
Figure 11A:
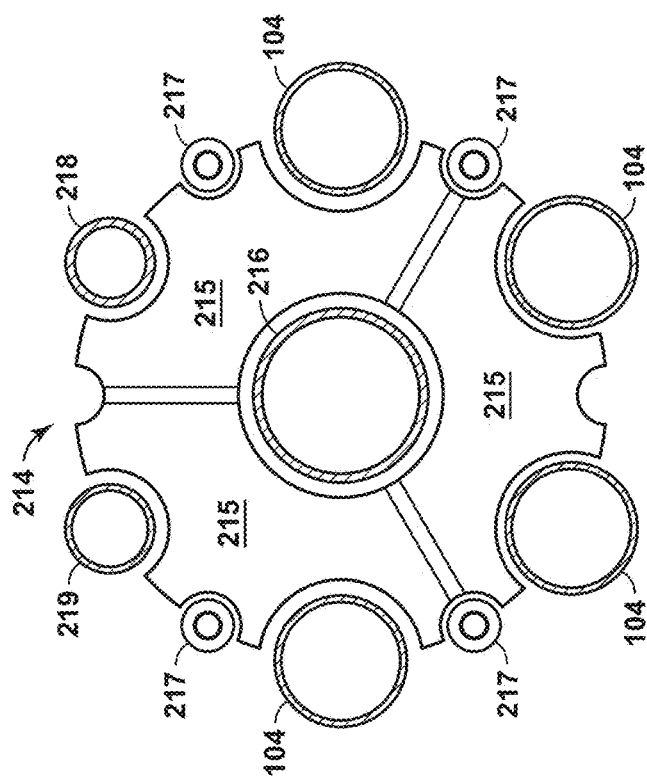
FIG. 11A illustrates a transverse cross-section of the riser tower system 212 of FIG. 11B along line 11A-11A.

FIG. 11B illustrates a riser tower system according to one or more embodiments of the present disclosure. The riser tower system 212 includes rigid risers 104 supported by a central core pipe 214. For the sake of clarity, only two of the rigid risers 104 are depicted with a plurality of fatigue performance enhancers 110 located proximate the seafloor. Riser guides 213 are also included. FIG. 11A illustrates a transverse cross-section of the riser tower system of FIG. 11B along line 11A-11A. As shown in FIG. 11A, the central core pipe 214 includes central structural pipe 216 and buoyancy elements 215. Multiple rigid production risers 104 as well as gas lift risers 217, water injection riser 218, gas injection riser 219 are circumferentially spaced around the outer surface of the central core pipe 214. Although the central core pipe 214 is shown in FIG. 11A as including buoyancy elements distributed along a length of the central core pipe 214, alternatively or in addition, the central core pipe 214 may be supported at the upper end by a buoyancy member, such as a buoyancy tank.

Figure 12:
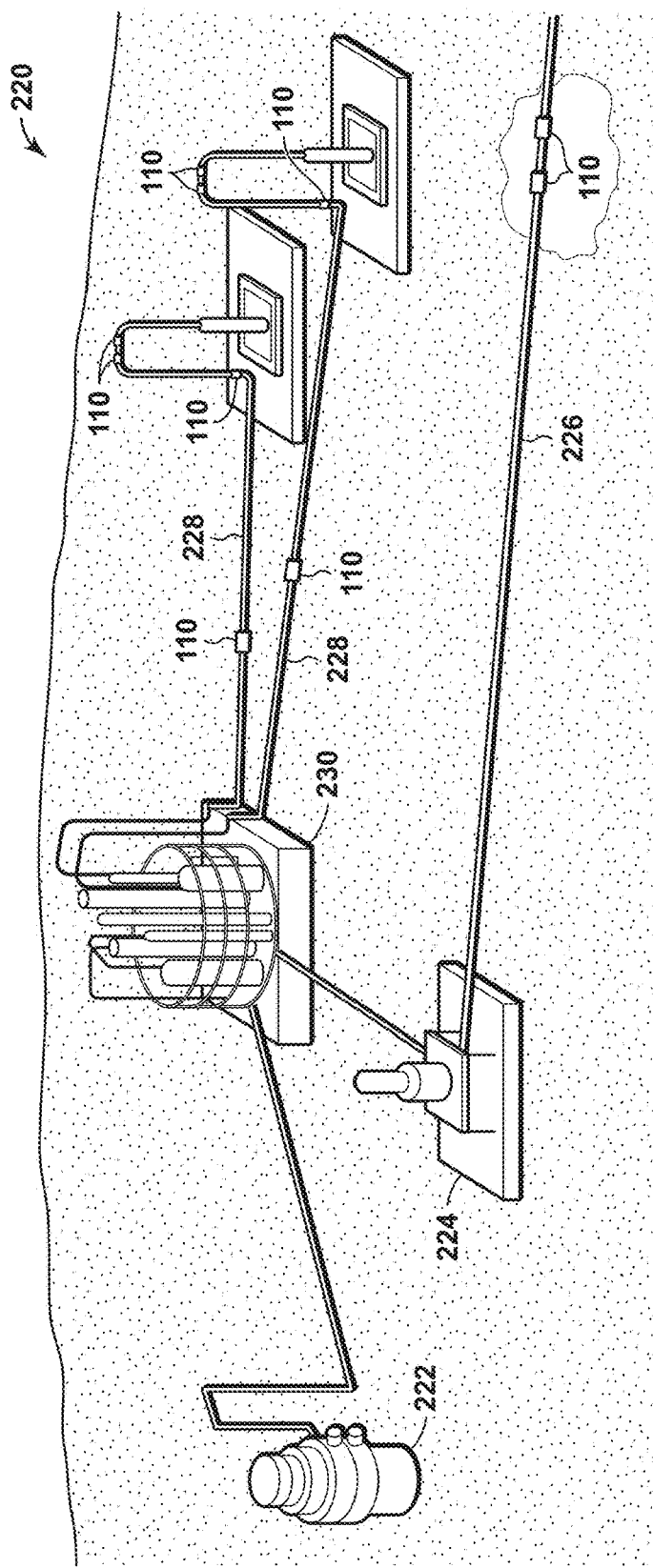
FIG. 12 illustrates a subsea system according to one or more embodiments of the present disclosure.

FIG. 12 illustrates a subsea system according to one or more embodiments of the present disclosure. As discussed herein, the fatigue performance enhancers may be used in any fatigue sensitive region of a subsea system 220. As depicted in FIG. 12, fatigue performance enhancers 110 are positioned on dynamic portions of jumpers 228 and conduit 226 which may experience motion during operation and cause fatigue. Fatigue performance enhancers 110 are positioned on conduit 226 in an area that is not supported by the seafloor. Conduit 226 may be a pipeline connected to a PLET connector 224 or a flowline connected to a FLET connector 224. Although not shown in FIG. 12, the other end of the pipeline or flowline may be connected to a PLET or FLET connector which may be connected to a riser (not shown). Also depicted in FIG. 12 is a manifold 230 to which the jumpers 228 and conduit 226 are operatively connected and a wellhead 222 which is operatively connected to manifold 230. Fatigue performance enhancers 110 are also positioned on the jumpers 228 at the bends in the jumpers 228 distal to the manifold 230 and along the length of the jumpers 228 between the manifold 230 and the distal bends.

Figure 13:
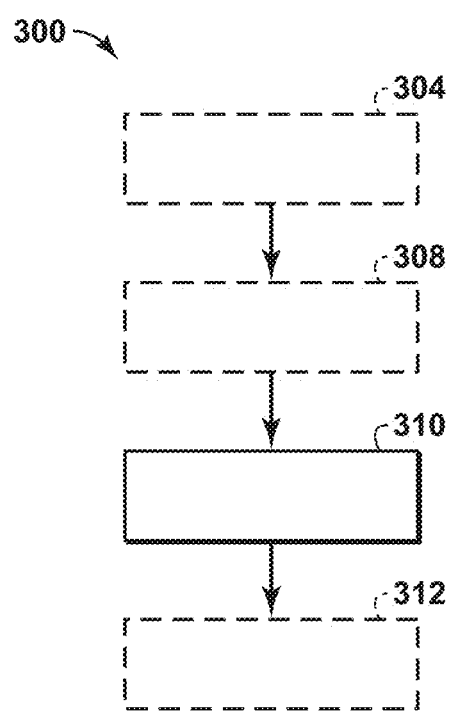
FIG. 13 illustrates a flow chart for a method of enhancing fatigue performance of a riser system in accordance with one or more embodiments of the present disclosure.

FIG. 13 illustrates a flow chart for a method 300 of enhancing fatigue performance of a rigid riser in accordance with one or more embodiments of the present disclosure. At block 310, one or more fatigue performance enhancers are installed over one or more girth weld joints between rigid metal sections of the rigid riser. In one or more embodiments, during installation, at least one of the one or more fatigue performance enhancers is centered over the girth weld joint to provide an area of maximum radial cross-sectional thickness of the fatigue performance enhancer directly, radially adjacent the girth weld joint. In one or more embodiments, the installation of the one or more fatigue performance enhancers may include disposing a first axial unitary segment and a second axial unitary segment around the circumference of the rigid riser and using a plurality of fasteners to secure the segments in position. It is understood that one or more fatigue performance enhancers may alternatively or additionally be installed over an underlying conduit, such as a rigid riser and/or other non-rigid conduit, in any areas determined to experience high fatigue. For example, fatigue performance enhancers may be installed on a subsea jumper proximate bend locations.

At block 308, the method 300 may also include installing the rigid riser. Installation of the rigid riser includes girth welding a plurality of rigid metal sections together to form the rigid riser. Girth welding the ends of the rigid metal sections together may use a welding process selected from gas tungsten arc welding (or TIG welding), gas metal arc welding (or MIG welding), shielded metal arc welding (or stick welding), flux-cored arc welding, friction stir welding, and combinations thereof. The girth weld joint may be a butt weld. The one or more fatigue performance enhancer may be installed during installation of the rigid riser once the girth weld joint is formed or may be installed after installation of the rigid riser (post-installation).

At block 304, the method 300 may also include manufacturing the one or more fatigue performance enhancers. The manufacturing of the one or more fatigue performance enhancers includes forming the body of the fatigue performance enhancer. A plurality of fasteners may be provided to secure the body of the fatigue performance enhancer to the rigid riser. When the body of the fatigue performance enhancer includes a polymeric material and metallic insert(s), the polymeric material is formed around the metallic insert(s) such that the metallic insert(s) are embedded and in direct contact with the polymeric material without any gaps.

At block 312, the rigid riser system including the rigid riser and one or more fatigue performance enhancers disposed thereon is utilized in drilling and/or production operations for developing and/or producing offshore hydrocarbon reservoirs. It is understood that blocks indicated with broken lines include optional features that may be performed alone or in combination with other methods.

It should be understood that the preceding is merely a detailed description of specific embodiments of the invention and that numerous changes, modifications, and alternatives to the disclosed embodiments can be made in accordance with the disclosure without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open-ended so as to include, optionally, multiple such elements.

What is claimed is:

1. A rigid riser system comprising:
a rigid riser including a plurality of rigid metal sections welded together to form a plurality of girth weld joints; and
one or more fatigue performance enhancers positioned over one or more of the plurality of girth weld joints of the rigid riser;
wherein the one or more enhancers include a body having a central region extending a first axial length of the enhancer; a first end region extending a second axial length of the enhancer; and a second end region extending a third axial length of the enhancer, the first axial length, the second axial length and the third axial length forming the total length of the enhancer, the central region having a greater average radial cross-sectional thickness than each of the first end region and the second end region.

2. The rigid riser of claim 1, wherein at least one of the one or more enhancers is positioned over at least one of the plurality of girth weld joints of the rigid riser proximate a seafloor in a touch down zone.

3. The rigid riser of claim 1, wherein at least one of the one or more enhancers is positioned over at least one of the plurality of girth weld joints of the rigid riser proximate a structure on a surface of a body of water to which the rigid riser is connected.

4. The rigid riser of claim 1, wherein the first axial length is substantially the same as or less than the sum of the second axial length and the third axial length.

5. The rigid riser of claim 1, wherein the average radial cross-sectional thickness of the central region is at least 1.5 times greater than the average radial cross-sectional thickness of each of the first end region and the second end region.

6. The rigid riser of claim 1, wherein the central region of the enhancer is centered over the associated girth weld joint.

7. The rigid riser of claim 1, wherein the body of the one or more enhancers includes a polymeric material and a metallic insert disposed within the polymeric material between an inner surface of the enhancer and an outer surface of the enhancer.

8. The rigid riser of claim 7, wherein the metallic insert includes a plurality of longitudinally spaced rings connected by a plurality of circumferentially spaced longitudinal members extending between the plurality of rings.

9. The rigid riser of claim 7, wherein the metallic insert is positioned within at least the central region of the enhancer.

10. The rigid riser of claim 1, wherein the body of each enhancer comprises at least two axial unitary segments disposed circumferentially around the circumference of the rigid riser and secured in position using a plurality of fasteners.

11. The rigid riser of claim 10, wherein the plurality of fasteners are selected from a strap, a clamp, a bolted ring, a bolt, and any combination thereof.

12. A fatigue performance enhancer for enhancing fatigue resistance and/or fatigue life of an underlying conduit comprising a body, the body including:
   a central region extending a first axial length of the enhancer;
   a first end region extending a second axial length of the enhancer; and
   a second end region extending a third axial length of the enhancer,
   wherein the first axial length, the second axial length and the third axial length forms the total length of the enhancer, and the central region has a greater average radial cross-sectional thickness than each of the first end region and the second end region; and
   wherein the body of the enhancer includes a polymeric material and a metallic insert disposed within the polymeric material between an inner surface of the enhancer and an outer surface of the enhancer.

13. The enhancer of claim 12, wherein the first axial length is substantially the same as or less than the sum of the second axial length and the third axial length.

14. The enhancer of claim 12, wherein the average radial cross-sectional thickness of the central region is at least 1.5 times greater than the average radial cross-sectional thickness of each of the first end region and the second end region.

15. The enhancer of claim 12, wherein the body of the enhancer comprises at least two axial unitary segments disposed circumferentially around the conduit and secured in position using a plurality of fasteners.

* * * * *